United States Patent Office 2,762,745
Patented Sept. 11, 1956

2,762,745
INJECTABLE KHELLIN SOLUTION

Wilhelm Hubert Benend, Munich-Solln, Germany

No Drawing. Application July 30, 1954,
Serial No. 446,969

Claims priority, application Germany August 8, 1953

1 Claim. (Cl. 167—65)

The present invention relates to improved therapeutic injectable solutions of khellin (5,8-dimethoxy-2-methyl-4',5'-furo-6,7-chromone).

Increasing use has been made in the last few years of khellin in the treatment of heart conditions and especially angina pectoris. It is known that even very small doses administered parenterally quickly and certainly produce good therapeutic effects. However, on oral administration, it has been found that gastric disturbances occur in a large number of the cases so treated (Uhlenbroock, Deutsche Medizinsche Wochenschrift No. 1, 1953, page 12). The extraordinarily low solubility of khellin in water makes it practically impossible to produce pure injectable aqueous solutions. Consequently, originally, injectable compositions were produced by suspending khellin in oil. These oil suspensions however were unstable and were not found satisfactory. It was later found that it was possible to produce stable aqueous solutions of khellin with the aid of sodium salicylate. However, in order to dissolve 20 mg. of khellin in 2 cc. of water, 300–400 mg. of sodium salicylate were required. The amounts of sodium salicylate required are therefore extraordinarily high and can lead to undesirable side reactions. For example, Uhlenbroock and others have reported that injection of the salicylate-khellin combination in patients with latent tentany can lead to cramps. The ion-exchange between the sodium salicylate and the calcium ions contained in the blood evidently are the cause of this. If the calcium level of the blood is already low before injection of the salicylate-khellin combination, very sudden cramps can result. Also, the literature indicates that injections of the salicylate-khellin combination can give rise to venous pain which can be traced back to the presence of the salicylate and that for intramuscular injections it is necessary to use novocain to reduce the pain.

Theophylline has also been suggested as a solvent for khellin in water. However, with the optimal quantity of 20 mg. of theophylline, a maximum of 4 mg. of khellin can be dissolved in 2 cc. at 20° C. and, if the temperature is lowered, for example to 10 to 15° C., even these small quantities of khellin begin to crystallize out.

In accordance with the invention, it was unexpectedly discovered that relatively concentrated well tolerated injectable aqueous solutions of khellin can be produced with the aid of one or more water soluble theophylline derivatives such as:

1. 7-($\beta$-$\gamma$-dihydroxypropyl)-theophylline
2. 7-($\beta$-hydroxyethyl)-theophylline The combination of these compounds with khellin substantially improves the therapeutic effectiveness, as the theophylline derivatives named have a very favorable influence on disturbances of coronary blood flow and edema.

The excellent action of the solvents employed according to the invention is, for example, illustrated by the fact that it is possible to dissolve 50 mg. and more of khellin in 2 cc. of water with the aid of 300 mg. of 7-($\beta$-$\gamma$-dihydroxypropyl)-theophylline.

The following examples will serve to illustrate the preparation of several injectable khellin solutions according to the invention:

Example 1

3 grams of 7-($\beta$-$\gamma$-dihydroxypropyl)-theophylline were dissolved in 20 cc. of water. Thereafter, 0.5 gram of khellin were added and dissolved by heating.

Example 2

2 grams of 7-($\beta$-hydroxyethyl)-theophylline were dissolved in 30 cc. of water. Thereafter, 0.2 gram of khellin were added and dissolved by heating.

Example 3

1.25 grams of 7-($\beta$-hydroxyethyl)-theophylline and 0.75 gram of 7-($\beta$-$\gamma$-dihydroxypropyl)-theophylline were dissolved in 20 cc. of water. Thereafter, 0.3 gram of khellin were added and dissolved by heating.

I claim:

An injectable aqueous solution of khellin containing a greater quantity of khellin than that normally soluble in water, said aqueous solution containing a sufficient quantity of at least one water soluble theophylline derivative selected from the group consisting of 7-($\beta$-$\gamma$-dihydroxypropyl)-theophylline and 7-($\beta$-hydroxyethyl)-theophylline to maintain such khellin in solution.

References Cited in the file of this patent

Unlisted Drugs, vol. 4, No. 8, August 31, 1952, p. 121.
Ibid., vol. 4, No. 10, October 13, 1952, p. 147.
Clinical Medicine, Inside rear cover, January 1952.
(Copy in Pat. Off. Sci. Libr.)